United States Patent [19]

Wu et al.

[11] Patent Number: 5,245,451
[45] Date of Patent: Sep. 14, 1993

[54] LIQUID CRYSTAL DISPLAY METHOD AND APPARATUS WITH TUNEABLE PHASE COMPENSATION

[75] Inventors: Shin-Tson Wu, Northridge; Chiung-Sheng Wu, Los Angeles, both of Calif.

[73] Assignee: Hughes Aircraft Company, Los Angeles, Calif.

[21] Appl. No.: 766,943

[22] Filed: Sep. 27, 1991

[51] Int. Cl.[5] .............................................. G02F 1/133
[52] U.S. Cl. ........................................ 359/55; 359/53; 359/73
[58] Field of Search ....................... 359/73, 53, 55, 93, 359/94, 102

[56] References Cited

U.S. PATENT DOCUMENTS

| | | | |
|---|---|---|---|
| 4,408,839 | 10/1983 | Wiener-Avnear | 359/73 |
| 4,466,702 | 8/1984 | Wiener-Avnear et al. | 359/73 |
| 4,941,737 | 7/1990 | Kimura | 359/53 |
| 4,952,029 | 8/1990 | Hayashi et al. | 359/53 |
| 4,991,941 | 2/1991 | Kalmanash | 359/73 |
| 5,044,732 | 9/1991 | Kimura et al. | 359/53 |
| 5,119,220 | 6/1992 | Narita et al. | 359/73 |

FOREIGN PATENT DOCUMENTS

| | | | |
|---|---|---|---|
| 0137818 | 5/1990 | Japan | 359/73 |
| 0275416 | 11/1990 | Japan | 359/73 |
| 0011317 | 1/1991 | Japan | 359/73 |
| 0200212 | 9/1991 | Japan | 359/73 |

OTHER PUBLICATIONS

Bleha et al., "Application of the Liquid Crystal Light Valve to Real time Optical Data Processings", *Optical Engineering (The Journal of the Society of Photo-Optical Instrumentation Engineers*, Jul./Aug. 1978, vol. 17, No. 4, pp. 371-384.

Katoh et al., "Application of Retardation Compensation; A New Highly Multiplexable Black-White Liquid Crystal display With Two Supertwisted Nematic Layers", *Japanese Journal of Applied Physics*, vol. 26, No. 11, Nov., 1987, pp. L17784-L1786.

S. T. Wu, "Design of a liquid crystal based tunable electrooptic filter", *Journal of Applied Optics*, vol. 28, No. 1, Jan. 1, 1989, pp. 48-52.

*Primary Examiner*—William L. Sikes
*Assistant Examiner*—Huy K. Mai
*Attorney, Agent, or Firm*—V. D. Duraiswamy; W. K. Denson-Low

[57] ABSTRACT

A liquid crystal (LC) display method and apparatus applies respective active LC bias voltages to both a master LC cell, and a phase compensation LC cell for the master cell. The bias voltages are selected to reduce the response time of the master cell, and to establish a common multicolor dark state for that cell. With a proper selection of the bias voltages, the products of the liquid crystal thickness and birefringence for each cell are substantially equal and mutually cancel. A bias voltage is first established for one cell, and the bias voltage for the other cell is then scanned to locate the point of mutual cancellation. A range of different bias voltages are possible, and a suitable bias is selected to balance response time against the required operating voltage range. A multicolor display system using only a single light valve can be realized.

19 Claims, 5 Drawing Sheets

LIQUID CRYSTAL DISPLAY METHOD AND
APPARATUS WITH TUNEABLE PHASE
COMPENSATION

BACKGROUND OF THE INVENTION

1. Field of the Invention

This invention relates to liquid crystal light valve (LCLV) systems and methods that incorporate birefringence phase compensation.

2. Description of the Related Art

Liquid crystal light valves useful for projecting bright images are known in the art, and are discussed for example in Bleha et al., "Application of the Liquid Crystal Light Valve to Real Time Optical Data Processing", *Optical Engineering* (*The Journal of the Society of Photo-Optical Instrumentation Engineers*), Jul./Aug. 1978, Vol. 17, No. 4, pages 371-384. The light valve described in this publication includes a twisted nematic liquid crystal that controls the transmission of light from a polarizer to an analyzer having an optical axis that is oriented perpendicular to the polarizer's optical axis. In the null state, the axis of the projection beam is rotated in one direction during the initial pass through the liquid crystal, and is then rotated in the opposite direction during the return pass so that the beam cannot be transmitted through the analyzer. In the "on" state, an applied electric field across the liquid crystal causes the liquid crystal's optical axis to be tilted toward the direction of the electrical field. This introduces a phase retardation between the polarization components of the light which are parallel and perpendicular, respectively, to the liquid crystal's optical axis. As a result, linearly polarized light incident on the liquid crystal is reflected back through the liquid crystal as elliptically polarized light which includes a component transmitted through the analyzer.

The quality of the image produced by such a light valve depends in large part upon the contrast ratio between the null state and the "on" state of the liquid crystal. Specifically, the less light that is transmitted through the liquid crystal in the null state, the greater is the contrast ratio. A problem arises, however, when more than one wavelength of light is to be controlled by the liquid crystal. For example, if the liquid crystal light valve (LCLV) is to be used in a color video system, it would be desirable to project (for example) red, blue and green light onto the liquid crystal. The incident light beam is resolved into two components in the liquid crystal that have polarization electric field vectors parallel and perpendicular, respectively, to the major optical axis of the liquid crystal whenever the polarization direction of the incident light and the liquid crystal's optical axis are not parallel. Thus, a phase delay is introduced in the liquid crystal between the two components. This phase delay arises because the liquid crystal exhibits different refractive indices to the two light components, so that the two components travel through the liquid crystal at different velocities. The light transmitted through the liquid crystal is at least slightly elliptically polarized due to the phase delay between the two components so that, even in the null state, there is a small component of light that passes through the analyzer. The birefringence of a liquid crystal is dependent on wavelength; as wavelength increases, birefringence gradually decreases in the visible region. This makes it difficult to achieve a perfect dark state during null voltage for a broadband light source, and thereby degrades the system's contrast. For example, if the null state transmission is minimized at one wavelength, it will usually cause light leakage at other wavelengths, thus making it impossible to achieve perfect darkness in the null state when a plurality of colors is used.

A phase compensation technique has previously been developed to improve the LCLV's contrast ratio. The technique involves passing light through two separate liquid crystal layers that have their major optical axes aligned perpendicular to one another at the intersection between the two liquid crystal layers. This technique has been applied to parallel-aligned light valves (Wiener-Avnear et al., U.S. Pat. No. 4,466,702, assigned to Hughes Aircraft Company); twisted nematic light valves (Wiener-Avnear; U.S. Pat. No. 4,408,839, assigned to Hughes Aircraft Company) and two supertwisted nematic liquid crystal cells (Katoh et al., "Application of Retardation Compensation; A New Highly Multiplexable Black-White Liquid Crystal Display With Two Supertwisted Nematic Layers", *Japanese Journal of Applied Physics*, Vol., 26, No. 11, Nov. 1987, pages L1784-L1786).

To achieve proper compensation, the compensation cell should be identical to the master cell. The contrast is sensitive to any phase mismatch between the compensation and master cells; a small thickness difference between the two from manufacturing tolerances can greatly degrade the contrast ratio. Temperature variations can produce the same undesirable effect.

The fixed phase retardation compensation approach described above also makes no improvement to the light valve's response time. This is particularly important for full-color direct view and projection displays, in connection with which nematic liquid crystals have been widely employed. For high resolution projection displays, three separate liquid crystal cells are used with each cell optimized for each color, such as red, green and blue. A major difficulty of this three-cell approach is in accurately aligning the corresponding pixel elements of the different cells. Processing all three colors with a single cell would eliminate this pixel registration problem. However, the liquid crystal response time must be at least three times faster (less than 5.5 ms) than that of the three-cell approach to achieve the required 180 Hz color-sequential operation (for a 60 Hz system). Unfortunately, the response time of a twisted nematic or supertwisted nematic liquid crystal cell is about 5 to 10 times too slow for this purpose.

High speed nematic liquid crystal modulators with response times less than 100 microseconds have been demonstrated recently with a parallel-aligned liquid crystal cell (S. T. Wu, "Nematic Liquid Crystal Modulator With Response Time Less Than 100 $\mu$s at Room Temperature", *Applied Physics Letters*, Vol. 57, pages 986-988 (1990). However, the contrast ratio of a parallel-aligned cell is good only for a narrow band laser wavelength. As the spectral bandwidth increases, the contrast ratio decreases dramatically. This severely limits the usefulness of the new parallel-aligned cell for full color systems.

SUMMARY OF THE INVENTION

The present invention seeks to provide a phase compensated, high speed liquid crystal display system and operating method that achieves a fast response time, high contrast ratio, wide viewing angle and low operation voltage, and can be used for full color liquid crystal displays with only a single display cell.

These goals are achieved by optically aligning master and phase compensation cells, and applying independent active bias voltages to each of the cells to reduce the master cell's response time compared to the prior unbiased compensation cell approach. The bias voltages for the two cells are selected so that the products of their liquid crystal thicknesses and birefringences mutually cancel. If the cells are truly identical, each will have the same bias voltage. To compensate for material and manufacturing tolerances and for temperature variations, the bias voltage for one of the cells is set at a selected level and the bias voltage for the other cell is scanned or tuned to locate the correct level for full compensation. Any of a range of bias voltages can be employed, allowing for a balancing of response time against a desired operating voltage range for the master cell. In tuning the bias voltage for one of the cells to achieve full compensation, the tuning progresses until a common multicolor dark state is achieved.

The invention results in a significant reduction in response time and allows an optical output from the master cell to be processed through a plurality of color in synchronism with the input signal.

These and other features and advantages of the invention will be apparent to those skilled in the art from the following detailed description, taken together with the accompanying drawings, in which:

DETAILED DESCRIPTION OF THE INVENTION

Figure 1:
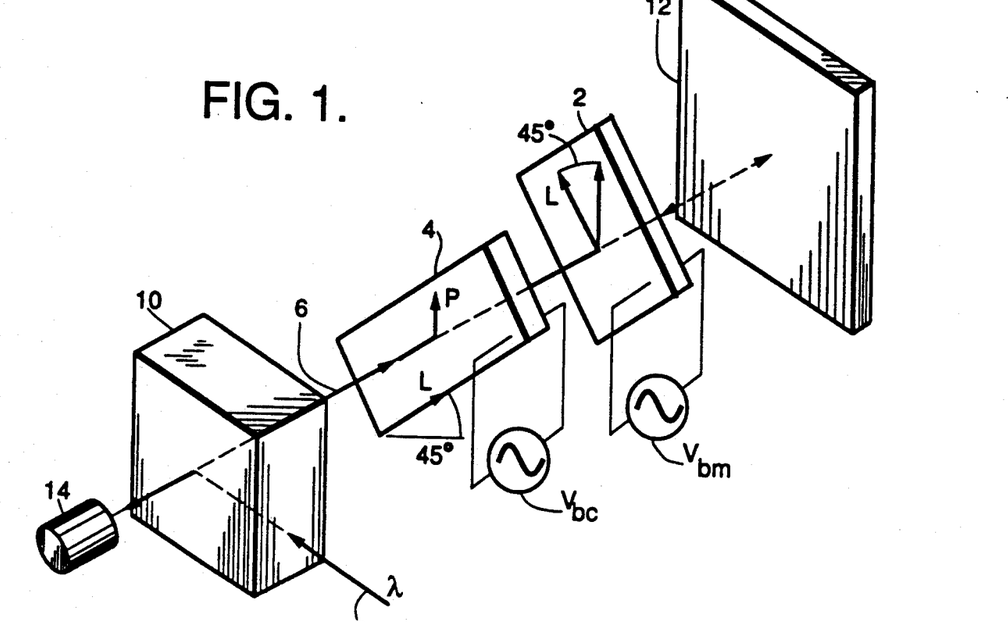
FIG. 1 is a block diagram taken in perspective of a phase compensation system in accordance with the invention.

A system that uses the present invention to produce a high contrast, fast response optical display is shown in FIG. 1. It includes a master liquid crystal (LC) cell 2 that can be either a multi-element active matrix liquid crystal display cell activated by individual pixel voltages, a single-element LC cell, or a multi-element LC cell incorporated into an LCLV (the term "LC cell" as used herein refers in general to any enclosed body of liquid crystals). A phase compensation LC cell 4 is positioned in optical alignment with the master cell 2. Both cells 2 and 4 are parallel to each other, but normal to an incident linearly polarized light beam 6 that is shown as the output of an incident beam 8 into a beam splitting polarizer 10. The director L, or principal axis of the liquid crystals, for the compensation cell 4 is oriented 45° to the incident light polarization P; the director L of the master cell 2 is also oriented 45° to the incident light polarization P, but 90° to the compensation cell director. The system can operate either in a transmissive mode with an output polarization analyzer, or in a reflective mode by the addition of a mirror 12 that re-directs light transmitted through the master and compensation cells 2,4 back through those cells in a second pass. The mirror 12 can be provided either externally as shown, or can be integrated into the master cell 2. A detector 14 is located on the opposite side of the beam splitting polarizer 10 from the LC cells in-line with the output from those cells.

A bias voltage $V_{bm}$ is applied across the master cell 2 to establish an electric field across its LCs. Up to this point the system is essentially similar to the phase retardation compensation systems described above. However, those systems operated with a passive, unbiased compensation cell 4. It has been discovered by the present inventors that the application of a properly selected bias voltage across the compensation cell can substantially reduce the system's response time without degrading the high contrast ratio. The compensation cell's bias also provides a previously unavailable flexibility to correct for phase mismatches between the master and compensation cells due to thickness or temperature differences, and to select the operating voltage of the master cell in a way that optimizes its performance. A wider viewing angle that is suitable for both direct view and projection displays, as well as a broad spectral bandwidth, can be achieved by providing the LC in the master and compensation cells with opposite pretilt angles.

These benefits result from the application of a separate bias voltage across the compensation cell 4 from a voltage source $V_{bc}$ whose output is generally similar to, but independent of, the master cell's voltage source $V_{bm}$. The bias voltages for both cells are AC to avoid degradation of the liquid crystal.

Figure 2:
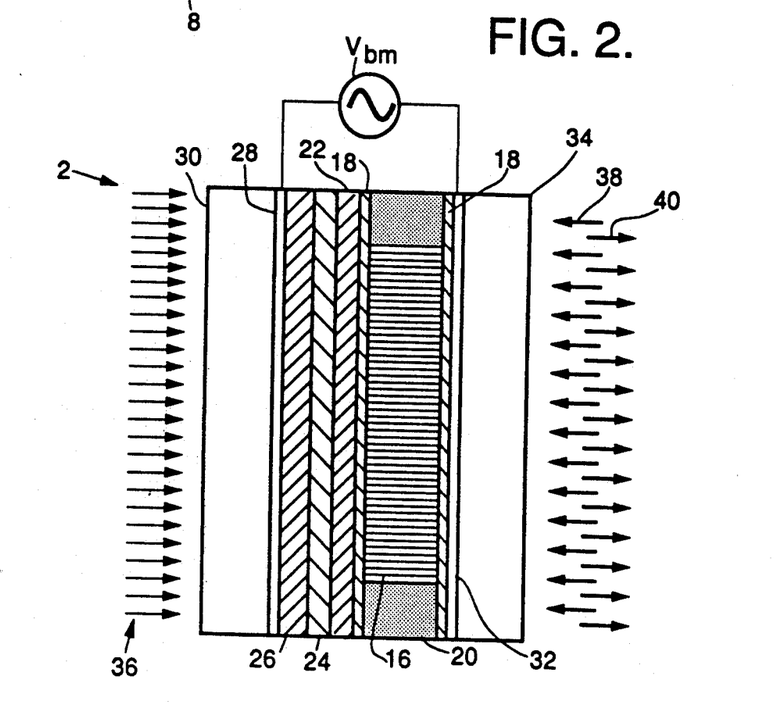
FIG. 2 is a sectional view of a photo-addressed LCLV suitable for use in the system of FIG. 1.

Before describing the new operation of the compensated system of FIG. 1, typical master and compensation cells will be described. These elements by themselves are conventional, and their structures by themselves do not form part of the invention. The master cell 2 may be either a pixelized LC cell such as an active matrix device, or an LCLV which has an LC cell integrated into it. A typical LCLV is shown in FIG. 2. It includes an LC layer 16 that is enclosed by a pair of liquid crystal alignment films 18 and an outer spacer 20. Formed in succession on the input side of the LC cell are a dielectric mirror 22, a light blocking layer 24, a photoconductor layer 26, a transparent conductive electrode 28, and a fiber optic plate 30. A transparent conductive counter-electrode 32 is formed on the output side of the LC cell, followed by an optical glass substrate 34. The bias voltage $V_{bm}$ is applied across the electrode 28 and counter-electrode 32.

The photoconductor 26 and LC layer 16 act as a voltage divider for $V_{bm}$. In a dark state with no input light, most of the bias voltage will be across the photoconductor 26, with the remainder across the LC layer 16. When the LCLV is illuminated by an input beam 36, the resistance of the photoconductor 26 drops and voltage shifts from the photoconductor to the LC. The liquid crystals rotate as the portion of the bias voltage which they carry changes, thus changing the proportion of a readout light beam 38 that can be transmitted through the LC. The readout light undergoes two passes through the LC, one before and one after reflection off the mirror 22. The optical output beam 40 thus carries an amplified version of the input image 36. The light valve can be altered in a conventional manner to operate in a transmission rather than a reflection mode; since there is only one optical pass in the transmission mode, the LC layer will generally be twice as thick.

Figure 3:
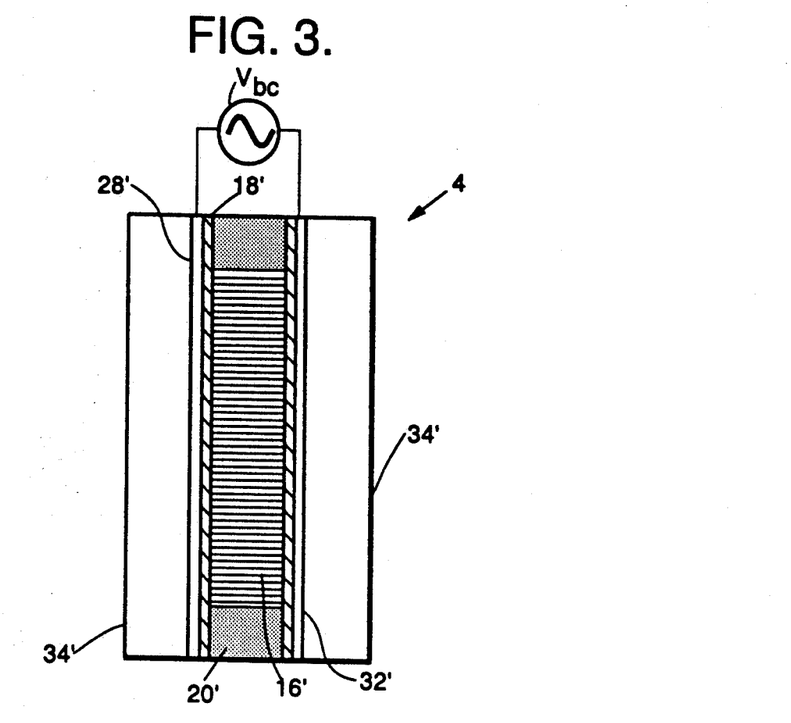
FIG. 3 is a sectional view of a liquid crystal compensator cell suitable for use in the system of FIG. 1.

An LC cell that can be used for the compensation cell 4, and also for the master cell 2 instead of an LCLV, is shown in FIG. 3. It is somewhat similar to the liquid crystal portion of the LCLV shown in FIG. 2, and includes a liquid crystal layer 16', alignment films 18', spacer 20', and transparent conductive electrode 28' and counter-electrode 32'. Optical glass substrates 34' are provided on the outer sides of the electrode 28' and counter-electrode 32'. If desired, the LCLV 2 and LC cell 4 can be integrated into a common structure by having them share the same substrate 34.

Figure 4:
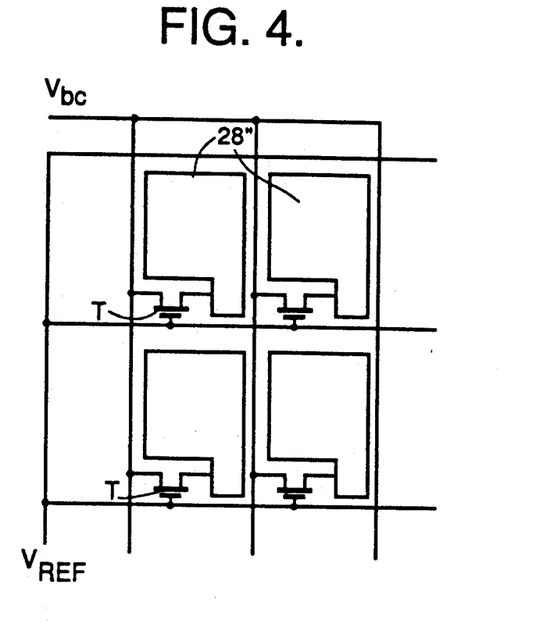
FIG. 4 is a schematic diagram of pixel control elements for the master liquid crystal cell of FIG. 1.

As opposed to the LCLV of FIG. 2, the electrode 28' and counter-electrode 32' of the active matrix LC cell of FIG. 3 are each divided into corresponding arrays of sub-electrodes 28'' aligned with respective sub-counter-electrodes, as indicated in FIG. 4. Each sub-electrode/sub-counter-electrode pair occupies the majority of the area in a corresponding pixel. The bias volta $V_{bc}$ is applied in common to each of the sub-electrodes through a thin film switch transistor T within each pixel area. Reference signals to turn the transistors on or off are provided from a voltage source $V_{ref}$.

It can be shown that the total phase retardation $\delta$ of incident light having a wavelength $\lambda$, after traversing two parallel-aligned LC cells (two traversals for the reflective mode) is:

$$\delta = 4\pi[d_1 \Delta n_1(\lambda, V_1, T_1) \pm d_2 \Delta n_2(\lambda, V_2, T_2)]/\lambda$$

where $d_1$ and $d_2$ represent the LC thicknesses of the two cells, and $\Delta n_1$ and $\Delta n_2$ represent the birefringence of the two cells. The $\Delta n$ of an LC cell has preciously been shown to depend upon the wavelength of the incident light, the applied voltage and the temperature. The additive sign in the above equation applies when the directors of the two cells are parallel. If the directors are crossed, as illustrated in FIG. 1, the phase retardation of the two cells becomes subtractive; the ordinary ray in the compensation cell 4 becomes extraordinary in the master cell 2, and vice versa. If these two cells are made nearly identical, biased at the same voltage and operated at the same temperature, then $\delta$ in the above equation vanishes regardless of the value of $\lambda$. No output light is transmitted, and the result is a common dark state for all values of $\lambda$.

Figure 5:
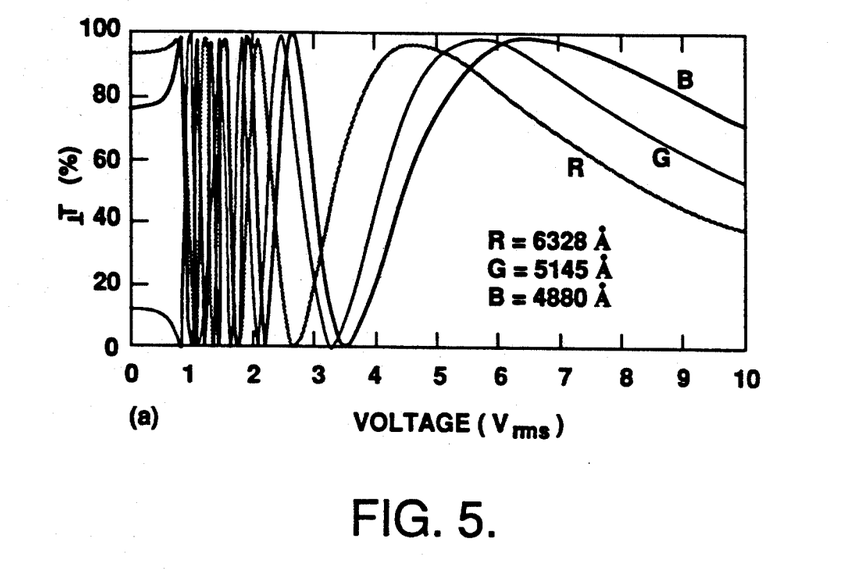
FIGS. 5 and 6 are multicolor optical transmission curves for liquid crystal cells respectively without and with the phase compensation of the present invention.

FIG. 5 shows the normalized transmission curves for a master cell alone, without a compensation cell, in a reflective mode of operation. This cell was formed from a parallel-aligned, 7 micron thick Zli-3926 LC mixture from E. Merck Co., with a $\Delta n$ of 0.20 and a $\Delta \epsilon$ of 15.8. The LC pre-tilt angle was about 2°. Due to birefringence dispersion of the LC, it is unlikely to find a common dark state for different wavelengths, such as the illustrated red (R), green (G) and blue (B) colors used for a color display, except at the extremely high voltage region well in excess of 10 volts at which all of the LC directors are re-oriented perpendicularly to the substrate surfaces.

With the present invention by contrast, a common dark state can be achieved with broadband incident light at any desired operation voltage. At voltages less than the cell's threshold voltage, the present compensated cell is equivalent to a homeotropically-aligned (HA) cell. However, unlike an HA cell which does not have a common dark state at voltages above the threshold voltage, the present compensated cell does have a common dark state. Also, the present compensated cell has a much wider viewing angle than an HA cell.

If the master and compensation cells are identical in structure and composition, with equal LC thicknesses and refractive indices, a common dark state will occur when both cells are biased at exactly the same voltage (for an LCLV in which a portion of the gross bias voltage is carried by the photoconductor, only the remaining portion of the gross bias voltage that is impressed across the LC layer is of interest for this purpose). Differences between the master and compensation cells can easily be reconciled by first setting a desired bias voltage for one of the cells, and then scanning or tuning the bias voltage for the other cell until full compensation and a true common dark state are achieved. The bias voltage for either the master or the compensation cell can be set first, with the bias voltage for the other cell scanned. Bias voltage tuning can also be used to at least partially compensate for variances from absolute perpendicular in the relative director orientations for the two cells.

Figure 6:
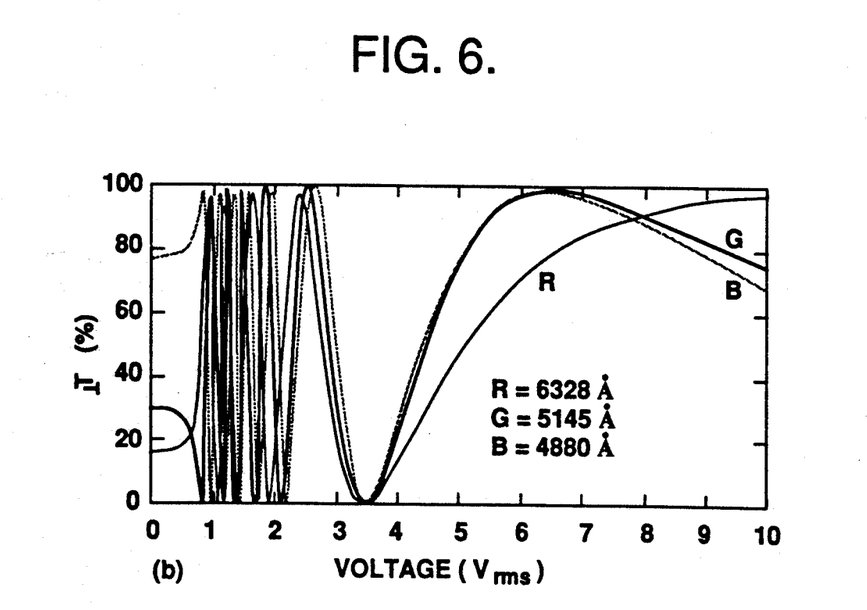

For the demonstration master cell whose operation is illustrated in FIG. 5, the bias voltage for the compensation cell was initially set at 3.5 $V_{rms}$; its threshold voltage was about 0.7 $V_{rms}$ at the 10 KHz sinusoidal wave frequency employed. The bias voltage of the master cell was then scanned until a common dark state was observed; the wave-form applied to both cells were similar to minimize the frequency effect upon dielectric constants. The results of the scanning are shown in FIG. 6 for the same RGB colors as in FIG. 5. Due to the phase subtraction from the compensation cell, the normalized transmissions of the master cell appear different from those in FIG. 5. However, a common dark state for all wavelengths did occur at a voltage of 3.5 $V_{rms}$, as expected. The operating voltage for the cell ranged from the bias level of 3.5 volts up to the next peak in the lowest wavelength curve, or about 6.5 volts for the illustration of FIG. 6.

Due to the effect of $\Delta n/\lambda$, the shorter wavelengths exhibit a steeper slope in the vicinity of the common dark state, as demonstrated in FIG. 6. The B response had the steepest slope in this area, followed by G and then R. The master cell's response time is greatly influenced by the bias voltage and the LC thickness. For a given LC thickness, a higher bias voltage results in a faster response time. However, a higher bias in effect stretches the curve of FIG. 6 out to the right, and a larger voltage swing is needed to reach maximum transmission. Conversely, a smaller voltage swing is required to reach maximum transmission when the bias voltage is reduced, but the response time is sacrificed accordingly. Another limitation of a lower bias voltage is that the width of the acceptable dark state is narrower, and as a result the contrast ratio is more sensitive to voltage fluctuations. The present invention allows a trade-off to be made between response time and operating voltage range.

An important factor in determining the permissible bias voltage range is the product $d\Delta n$ of the LC cells. For large $d\Delta n$ LC cells, more transmission cycles are available and the device can thus be operated at a higher bias. The higher bias voltage tends to neutralize the increase in response time that originates from the thicker LC layer. A typical LC thickness ranges from about 5 to 10 microns, depending upon the LC's $\Delta n$. The dependence of a cell's response time upon the applied bias voltage was previously established separate from the present invention in S. T. Wu; "Design of a Liquid Crystal Based Tunable Electrooptic Filter", *Applied Optics*, Vol. 28, No. 1, Jan. 1, 1989, pages 48–52.

Figure 7A:
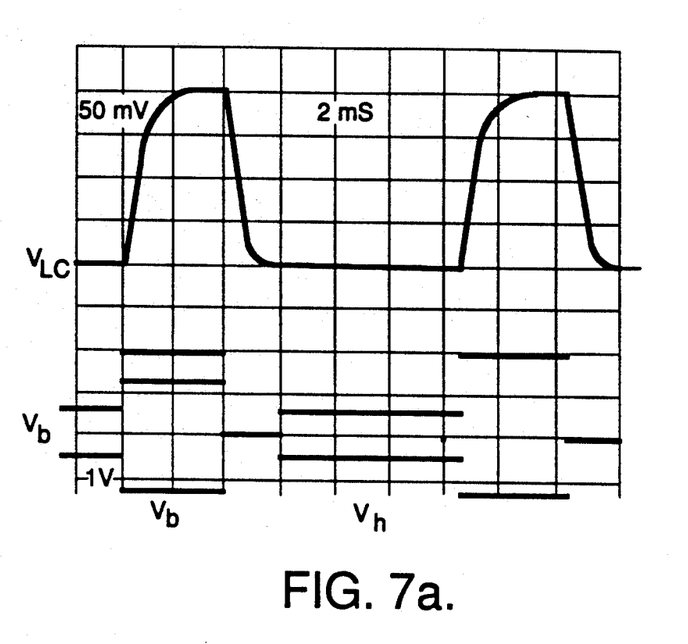
FIGS. 7a and 7b are optical transmission curves (upper traces) and the associated voltage waveforms (lower traces) of a liquid crystal cell operated in accordance with the invention, respectively with and without bias voltage undershoot.
Figure 7B:
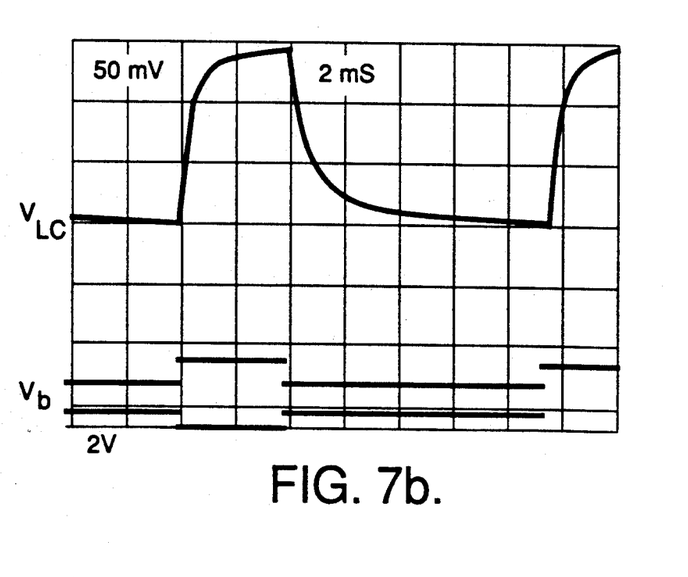

The optical response time of the master cell was measured at a temperature of 23° C. and a wavelength of 633 nm, both with and without undershoot in the applied bias voltage. The results are shown in the voltage traces of FIGS. 7a and 7b, respectively, in which the upper traces represent the voltages across the LC and the lower traces represent the applied bias voltages. When undershoot was used, the bias voltage was almost instantaneously removed at the beginning of the decay process, and held at 0 until the LC directors relaxed to their dark optical state. Due to the temporary removal of the bias voltage, the LC directors experienced the largest restoring torque, resulting in a fast decay time of about 1.5 ms for the 7 micron thick LC cell. Once the dark state is reached, a small holding voltage $V_h$ is applied to sustain the duration of the dark state, which is controlled by the pulse width of the holding voltage. The peak-to-peak bias voltage used in FIG. 7a was $\pm 12$ volts, with a root-mean-square voltage of 5.3 volts. In the transmissive mode the required voltage is even lower, but the response time is also slower. A situation without undershoot is illustrated in FIG. 7b. As shown in the upper voltage trace, a longer relaxation tail was observed. This slower decay time originates from the constant presence of the bias voltage. The decay time (to 10% of peak) was about 4 ms.

Undershoot is a conventional technique that is applicable to an active matrix display cell in which the input is an electrical signal. It is not compatible with an LCLV driven by the output of a cathode ray tube, in which there is a time delay between the raster-scanned CRT lines. Since the bias voltage for the LCLV is adusted simultaneously for all pixels, it cannot be coordinated with the CRT scanning. However charge-coupled device (CCD) LCLV transfers all of the charges in its pixel array simultaneously to the LC, and is therefore compatible with the undershoot technique.

The master cell's response time can be further improved by selecting LC materials with low viscosity and large splay elastic constant, such as fluoro rather than cyano based compounds. LCs with a small moment of inertia (associated with low molecular weight and linear shape), weak inter-molecular association and small activation energy result in lower rotational viscosity. Elevated temperature operation is also a desirable condition for reducing viscosity, and uniform heating of the master and compensation cells is important to retain a high contrast ratio.

The contrast ratio of the compensated cell is primarily determined by the uniformity of the two cells. A contrast ratio greater than 100:1 has been achieved, as shown in FIG. 7a. The viewing angle of the cell is, in principle, very wide due to the precise phase cancellation. The demonstrated cell had a viewing angle of at least 30° off-perpendicular, while maintaining a reasonably high contrast ratio. Thus, both direct view and projection displays can be realized with the present invention.

Figure 8:
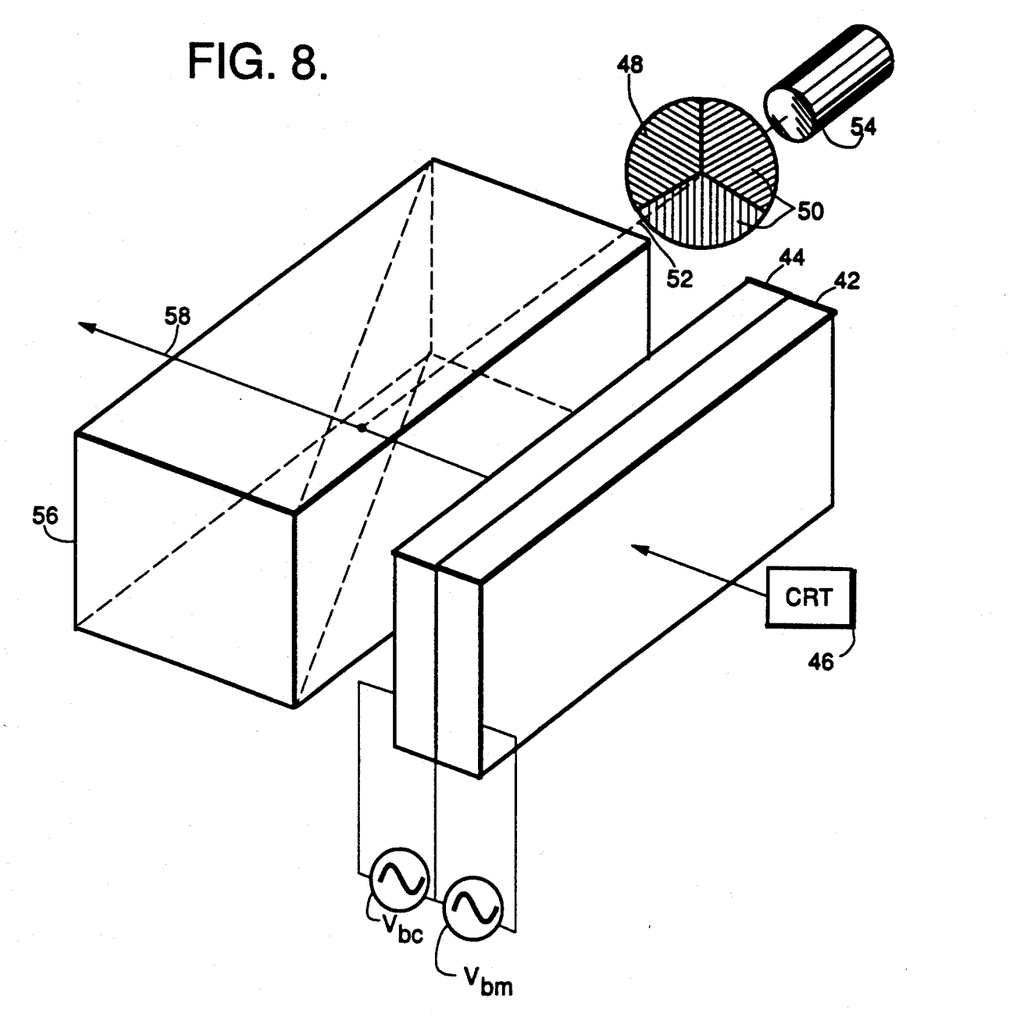
FIG. 8 is a block diagram of a three-color projection system in accordance with the invention.

A multicolor projection system that is based upon the invention and uses only a single LCLV is illustrated in FIG. 8. A reflective LCLV 42 and compensation LC cell 44 are shown abutting against each other, and share a common substrate. The cells 42,44 are independently biased by voltage sources $V_{bm}$ and $V_{bc}$, respectively, to establish a common multicolor dark state as described above. Light from a source such as CRT 46 is processed by the cells. The light source drives the LCLV at a 180 Hz rate. A color wheel 48 at the output of the cells is divided into equal R, G and B 120° filter sections, and is rotated in the path of processed beam 52 at 60 rotations per second. The rotation of the color filter wheel 48 is synchronized with raster scanning of the CRT 46 so that the optical display for each color is processed by the corresponding color filter of the color wheel. The resulting 3-color image is then projected by a suitable projector 54, or directly viewed. A beam splitting polarizer 56 is shown dividing the beam from cells 42,44 into the projection beam 52 and a direct view beam 58.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of biasing a master liquid crystal (LC) cell and a phase compensation cell for said master CL cell, comprising:
    providing said cells in optical alignment, each cell having a parallel-aligned LC layer, and
    applying respective active LC bias voltages to each of said cells to reduce the master cell's response time compared to its response time when the compensation cell is unbiased.

2. The method of claim 1, wherein the bias voltages for said cells are selected so that the $d\Delta n$ products for the two cells are substantially equal and of opposite sign and mutually cancel, where d is the thickness of the liquid crystal layer and $\Delta n$ is the liquid crystal birefringence.

3. The method of claim 2, wherein a bias voltage is established for one of said cells, and the bias voltage for the other cell is scanned to locate its bias voltage for said mutual $d\Delta n$ cancellation.

4. The method of claim 1, wherein said bias voltages are selected to improve the response time for said master cell against a desired operating voltage range for the master cell.

5. The method of claim 1, wherein said master cell is integrated into a liquid crystal light valve (LCLV).

6. The method of claim 1, wherein an input image is provided to said master cell and an optical output from said master cell is processed by a plurality of color filters in synchronism with said input image.

7. A method of processing an optical signal, comprising:
    providing a master liquid crystal (LC) cell and a phase compensation LC cell for said master LC cell, each cell having a parallel-aligned LC layer, said cells having similar LC compositions and thicknesses and being aligned for at least approximate phase retardation cancellation when the compensation cell is unbiased, and
    applying similar active LC bias voltages to said cells to reduce the master cell's response time compared to its response time when the compensation cell is unbiased.

8. The method of claim 7, said cells having a physical variance from each other, wherein the LC bias voltage for one of said cells is adjusted to a level that differs from the LC bias voltage for the other cell to compensate for said physical variance and establish a common multi-color dark state for said master cell.

9. The method of claim 7, wherein said bias voltages are selected to improve the response time for said master cell against a desired operating voltage range for the master cell.

10. The method of claim 7, wherein said master cell is integrated into a liquid crystal light valve (LCLV).

11. The method of claim 7, wherein an input image is provided to said master cell and an optical output from said master cell is processed by a plurality of color filters in synchronism with said input image.

12. A method of biasing a master liquid crystal (LC) cell and a phase compensation LC cell for said master LC cell, comprising:
providing said cells in optical alignment, each cell having a parallel-aligned LC layer,
applying respective active LC bias voltages to both of said cells, and
tuning the bias voltage for one of aid cells until a common multicolor dark state is achieved for said master cell.

13. The method of claim 12, wherein said master cell is integrated into a liquid crystal light valve (LCLV).

14. A self-aligned optical display system comprising:
a master liquid crystal (LC) display cell having a parallel-aligned LC layer,
a phase compensation LC cell, having a parallel-aligned LC layer, said phase compensation cell being optically aligned with said master cell to provide phase compensation therefor, and
first and second voltage bias means for applying independent bias voltages to said master and phase compensation cells.

15. The self-aligned optical display system of claim 14, at least one of said voltage bias means including means to scan the bias voltage for its associated cell to establish a common multicolor dark state for said master cell.

16. The self-aligned optical display system of claim 14, wherein said master cell is integrated into a liquid crystal light valve (LCLV).

17. A self-aligned multicolor optical display system, comprising:
a liquid crystal light valve (LCLV) for receiving an input optical signal corresponding to a desired optical pattern and for transmitting an output optical signal,
a liquid crystal (LC) phase compensation cell having a parallel-aligned LC layer, said cell positioned in optical alignment with said LCLV for at least approximate phase retardation cancellation therewith,
means for applying respective bias voltages to said LCLV and said compensation cell,
means for applying an input optical signal to said LCLV to establish an operating voltage for said LCLV, and
multicolor filter means for applying color filters to the output from said LCLV in synchronism with said input optical signal.

18. The system of claim 17, wherein the bias voltages for said LCLV and said compensation cell are selected so that the $d\Delta n$ products thereof are substantially equal and of opposite sign and mutually cancel, wherein d is the LC thickness and $\Delta n$ is the LC birefringence.

19. The system of claim 18, wherein the LC portions of said LCLV and compensation cell are substantially similar in composition and thickness.

* * * * *